US012139305B2

(12) United States Patent
Leung et al.

(10) Patent No.: US 12,139,305 B2
(45) Date of Patent: Nov. 12, 2024

(54) EXTRUDED SPRING STRAP FOR CONTAINER AND PACKAGING APPLICATIONS

(71) Applicants: Valentin Leung, Tai Wai (HK); John Violett, San Diego, CA (US)

(72) Inventors: Valentin Leung, Tai Wai (HK); John Violett, San Diego, CA (US)

(73) Assignee: Global Dispensing North America Inc, Oceanside, CA (US)

( * ) Notice: Subject to any disclaimer, the term of this patent is extended or adjusted under 35 U.S.C. 154(b) by 0 days.

(21) Appl. No.: 17/367,922

(22) Filed: Jul. 6, 2021

(65) Prior Publication Data

US 2022/0009679 A1 Jan. 13, 2022

Related U.S. Application Data

(60) Provisional application No. 63/048,935, filed on Jul. 7, 2020.

(51) Int. Cl.

*B65D 43/16* (2006.01)
*B65D 43/26* (2006.01)
*E05D 1/06* (2006.01)

(52) U.S. Cl.

CPC ........... *B65D 43/163* (2013.01); *B65D 43/26* (2013.01); *E05D 1/06* (2013.01); *B65D 2251/1058* (2013.01); *B65D 2251/1066* (2013.01)

(58) Field of Classification Search

CPC .................. B65D 43/163; B65D 43/26; B65D 2251/1058; B65D 2251/1066; E05D 1/02; E05D 1/06

USPC ........ 220/254.5, 827, 829, 845, 847; 16/225

See application file for complete search history.

(56) References Cited

U.S. PATENT DOCUMENTS

| | | | | | |
|---|---|---|---|---|---|
| 3,441,975 | A * | 5/1969 | Shepherd | E05D 1/02 | 16/385 |
| 4,205,762 | A * | 6/1980 | Wolfseder | A45C 5/02 | 16/225 |
| 5,539,955 | A * | 7/1996 | Wiese | E05D 1/02 | 16/225 |
| 5,620,107 | A * | 4/1997 | Takeuchi | B65D 47/0809 | 220/827 |
| 5,699,912 | A * | 12/1997 | Ishikawa | B65D 47/0871 | D9/733 |
| 5,941,412 | A * | 8/1999 | Mahoney | B65D 43/166 | 220/847 |

(Continued)

*Primary Examiner* — James N Smalley

(74) *Attorney, Agent, or Firm* — White-Welker & Welker, LLC; Matthew T. Walker, Esq.

(57) ABSTRACT

A silicone extruded spring strap that has the possibility to be folded around an axis parallel to its own axis of extrusion, thus creating the compression and release as of a spring. The base has a reach-in hole on its body to allow the user to reach through. The lid is the base's capping object; it is designed to cover the reach-in hole of the base. It should be designed in a way to limit the area of the remaining gaps of the base's reach-in hole. The spring strap clip designed to allow the extension of the spring during the closing motion of the lid. The extruded spring strap can store and release energy in order to displace the lid. It can be of any material that provides the appropriate stiffness to activate the lid. The retention latch is the user interface on which he acts in order to have the lid popup.

14 Claims, 14 Drawing Sheets

(56) References Cited

U.S. PATENT DOCUMENTS

| | | | | |
|---|---|---|---|---|
| 7,004,349 | B2 * | 2/2006 | Heiberg | B65F 1/1646 220/264 |
| 7,243,816 | B2 * | 7/2007 | Aochi | B65D 25/2811 220/759 |
| 8,245,865 | B2 * | 8/2012 | Damaghi | B65D 43/164 220/264 |
| 10,724,253 | B1 * | 7/2020 | Fries | E05D 1/06 |
| 2006/0096984 | A1 * | 5/2006 | Bandoh | B65D 83/08 220/264 |
| 2013/0276266 | A1 * | 10/2013 | Pendarvis | E05D 1/02 16/225 |
| 2014/0175098 | A1 * | 6/2014 | Lane | B65D 43/26 220/212.5 |
| 2018/0032109 | A1 * | 2/2018 | Määttä | G06F 1/1681 |
| 2019/0110566 | A1 * | 4/2019 | Hatanaka | H04M 1/185 |

* cited by examiner

EXTRUDED SPRING STRAP FOR CONTAINER AND PACKAGING APPLICATIONS

SEQUENCE LISTING OR PROGRAM

Not Applicable

TECHNICAL FIELD OF THE INVENTION

The present invention relates generally to containers lids. More specifically, the present invention relates to self-opening, re-closable lids for use with a container or packaging device or other such apparatus.

BACKGROUND OF THE INVENTION

In the packaging industry, around reach-in areas, manufacturers are using springs to create pop-up lids or cover activated closures. They need to have a device that is able to create a force to move the lid when the end-user is activating the opening device. The device also needs to be simple in shape and inexpensive enough in order to provide an easy integration, a low cost of goods, and a low scrap material rate in the manufacturing process.

Therefore, what is needed is a silicone extruded spring strap, which is a device that has the possibility to be folded and stretched, thus creating the compression and release like one found on a metallic coil spring. The fact that it is an extruded shape means there is virtually no material scrap, it is cut at the designed length. Current silicone springs need to be shaped in different complex forms, the most common is the T-form. The T-form is already performing the spring function very well, but it is more complex to manufacture as it needs to be punched through a sheet of silicone, and subsequently, the manufacturing process produces a large amount of web (scrap from the punching process). Sometimes it is molded, but as the shape is complex, requires specific complex steps in the manufacturing process to allow for assembly.

What is needed is a silicone spring product that can be produced quickly and results in less manufacturing process scrap. The spring of the present invention provides this solution as a manufacturer only needs to cut the spring at the right length during the manufacturing process, which results in no scrap.

SUMMARY OF THE INVENTION

The present invention is a silicone extruded spring strap or spring strap that has the possibility to be folded around an axis parallel to its own axis of extrusion, thus creating the extension and release like a spring. It is accompanied by a spring strap clip that is used to hold and fix in position the spring strap unto a closure system. In one embodiment, a reach-in device is designed to let a user interact with the silicone extruded spring strap component to open and close a lid. This application provides a degree of air sealing that allows the lid to effectively separate two environments, above and below itself. The base body of the device of this embodiment is made of any hard material including but not limited to plastic. The base has a reach-in hole on its body to allow the user to reach through. The lid is the base's capping object, it is designed to cover the reach-in hole of the base. It can be of any size but in the best case, should be designed in a way to limit the area of the remaining gaps of the base's reach-in hole. The lid is made of any hard material including but not limited to plastic. The extruded spring strap can store and release energy in order to displace the lid. It can be of any material that provides the appropriate stiffness to activate the lid. It is attached to the lid and base and held in position by a spring strap clip. The retention latch is the user interface used to make the lid pop-up. It is a part of the base or the lid or can be an additional part assembled to the closure by means of fasteners.

REFERENCE CHARACTERS

1. spring strap
1.*a* ridge (x2)
2. spring strap clip
2.*a* slot (x2)
2.*b* boss (x4)
2.*c* holes (x4)
2.*d* living hinge (An arrow to indicate that the spring strap is to be flip and inserted into the spring strap clip.}
3. Spring Clip Sub-assembly: spring strap clip with spring strap
4. lid/base closure system (An arrow indicates that the sub-assembly is to be flip and inserted into the lid/base\closure system with proper alignment of hole/boss and snap-fit features.)

BRIEF DESCRIPTION OF THE DRAWINGS

The accompanying drawings, which are incorporated herein form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized, and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Referring to the figures, it is possible to see the various major elements constituting the apparatus of the present invention.

Figure 1:
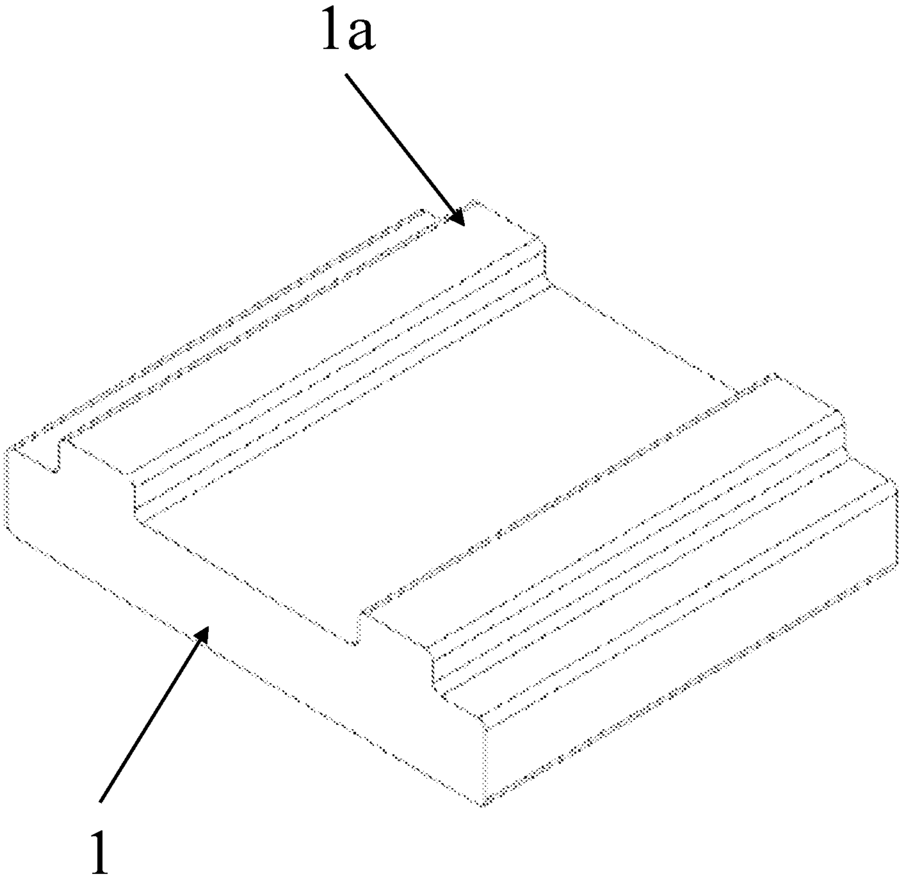
FIG. 1 is an illustration of the spring strap of the present invention in a normal state as depicted in a CAD model.

The Figures illustrate the embodiment of a silicone extruded spring strap 1, the first key design feature is the two ridges 1*a* on each edges of its section, it also has the possibility to be folded around an axis parallel to its own axis of extrusion, thus creating the extension and release as of a spring used in a container. FIG. 1 is an illustration of the spring strap 1 of the present invention in a normal state as depicted in a CAD model. The two ridges 1*a* act as stopper and this allow the spring to be held on both extremities to be extended.

Figure 2:
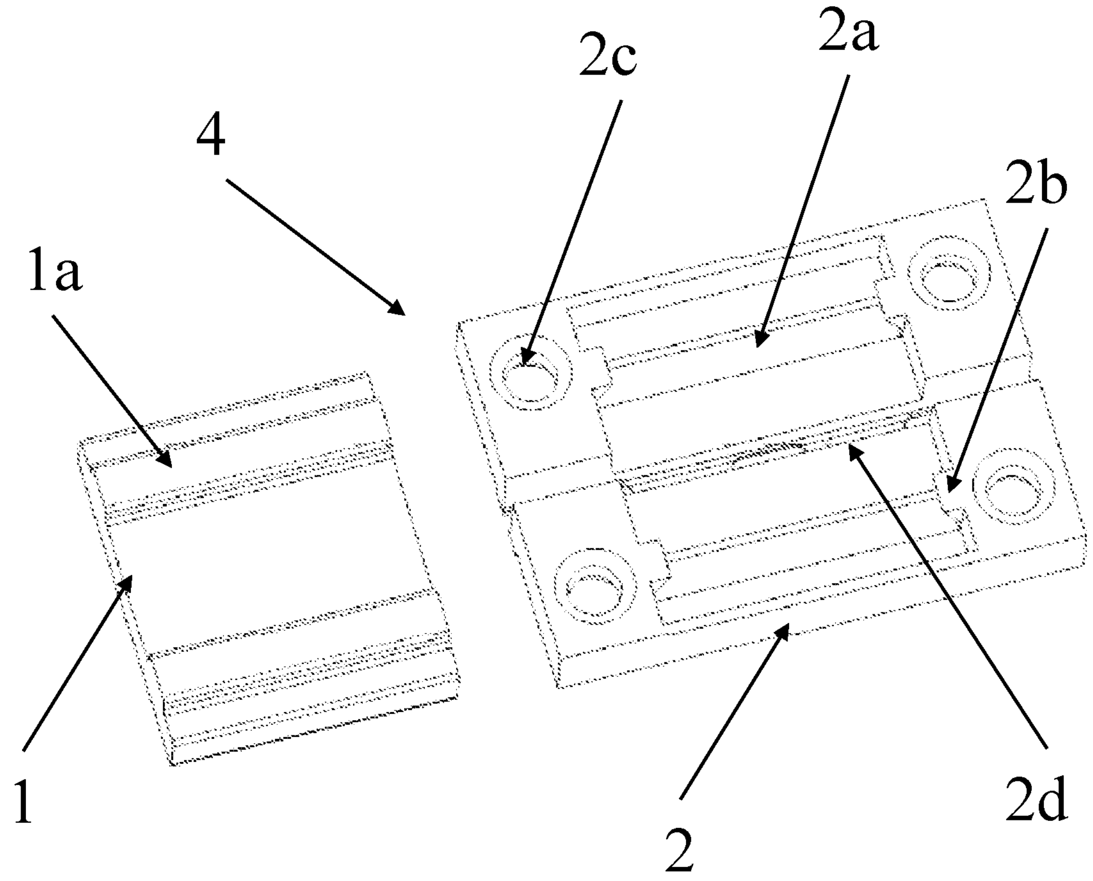
FIG. 2 is an illustration of the spring strap of the present invention alongside the spring strap clip in their normal state as depicted in a CAD model.

FIG. 2 is an illustration of the spring strap 1 of the present invention alongside the spring strap clip 2 in their normal state as depicted in a CAD model. The spring strap 1 is designed to interact with the spring strap clip 2, which can be made of any hard material including but not limited to plastic. The spring strap clip 2 has different geometric features, it has two slots 2*a* to allow insertion and position locking of the spring strap 1, it also has embossed features 2*b* to prevent the spring strap 1 to fall from the clip 2 when it is inserted using a friction contact. The spring strap clip 2 also has holes 2*c* and other geometric features designed to act as fastening features for assembly on a closure. In the middle area of the spring strap clip 2, we can find a living hinge 2*d* that allows the spring strap clip 2 to be folded.

Figure 3:
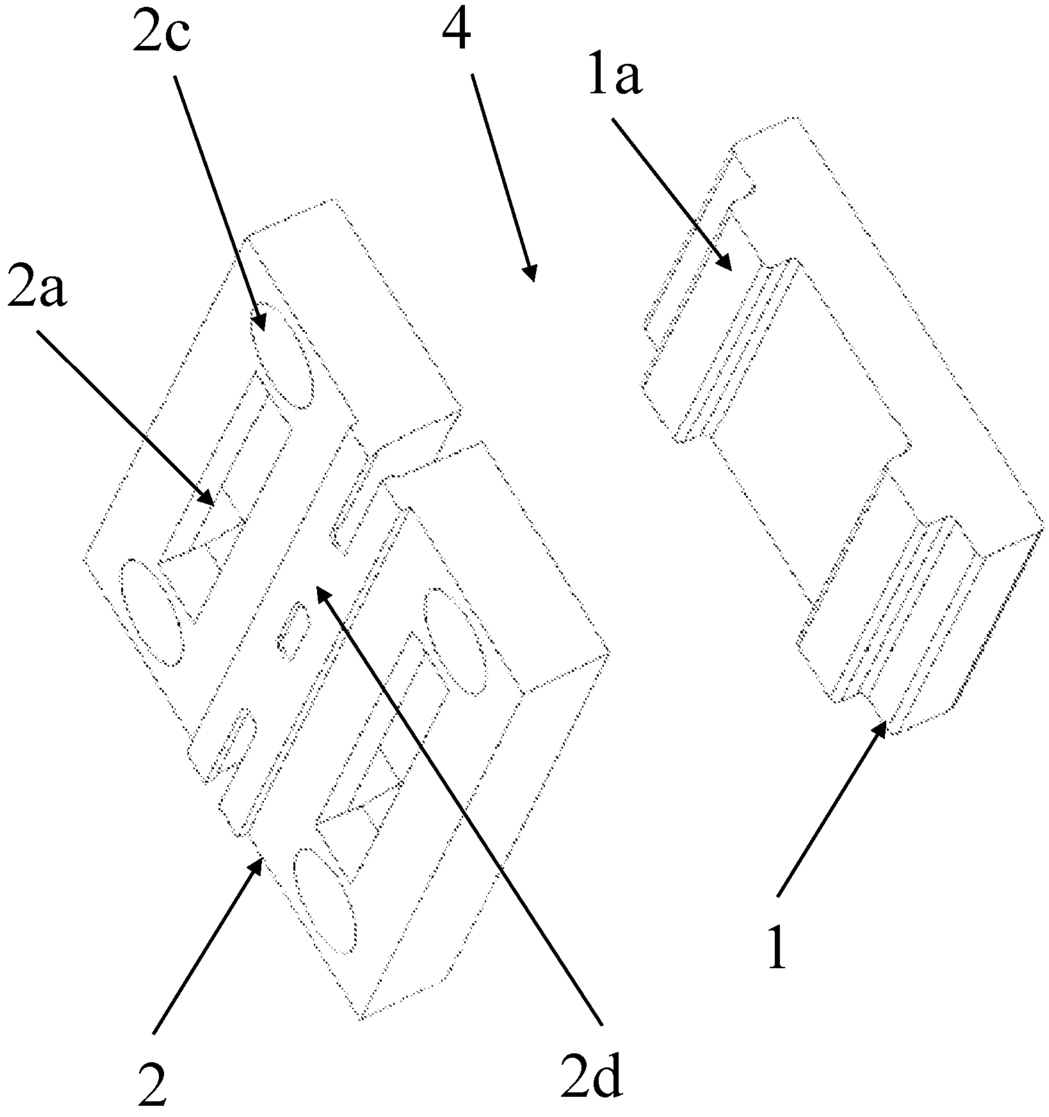
FIG. 3 is an illustration of the spring strap of the present invention alongside the spring strap clip in their normal state as depicted in a CAD model, they are shown as they would be before assembly, the spring strap's two ridges will lock with the spring strap clip's two slots.

FIG. 3 is an illustration of the spring strap 1 of the present invention alongside the spring strap clip 2 in their normal state as depicted in a CAD model, they are shown as they would be before assembly, the spring strap's two ridges 1*a* will lock with the spring strap clip's two slots 2*a*. The spring strap two ridges 1*a* are aligned with the spring strap clip slots 2*a* during assembly.

Figure 4:
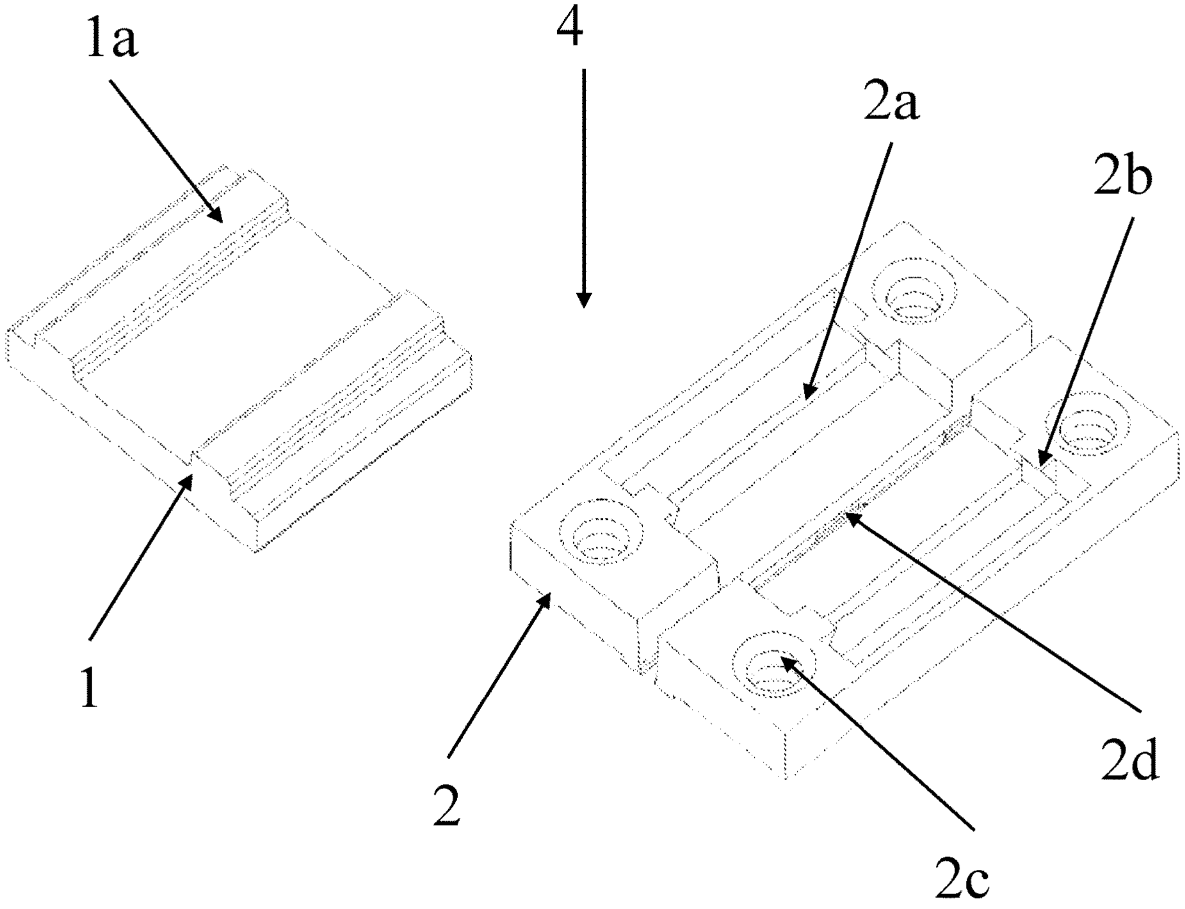
FIG. 4 illustrates a prototype product incorporating the spring strap clip place besides a spring strap clip in their normal state.

FIG. 4 illustrates a prototype product incorporating the spring strap clip 2 place besides a spring strap clip 2 in their normal state. Once the spring strap 1 is inserted to the spring strap clip 2, the back surface is held by embossed areas 2*b* to prevent the spring strap 1 to detach from the spring strap clip 2.

Figure 5:
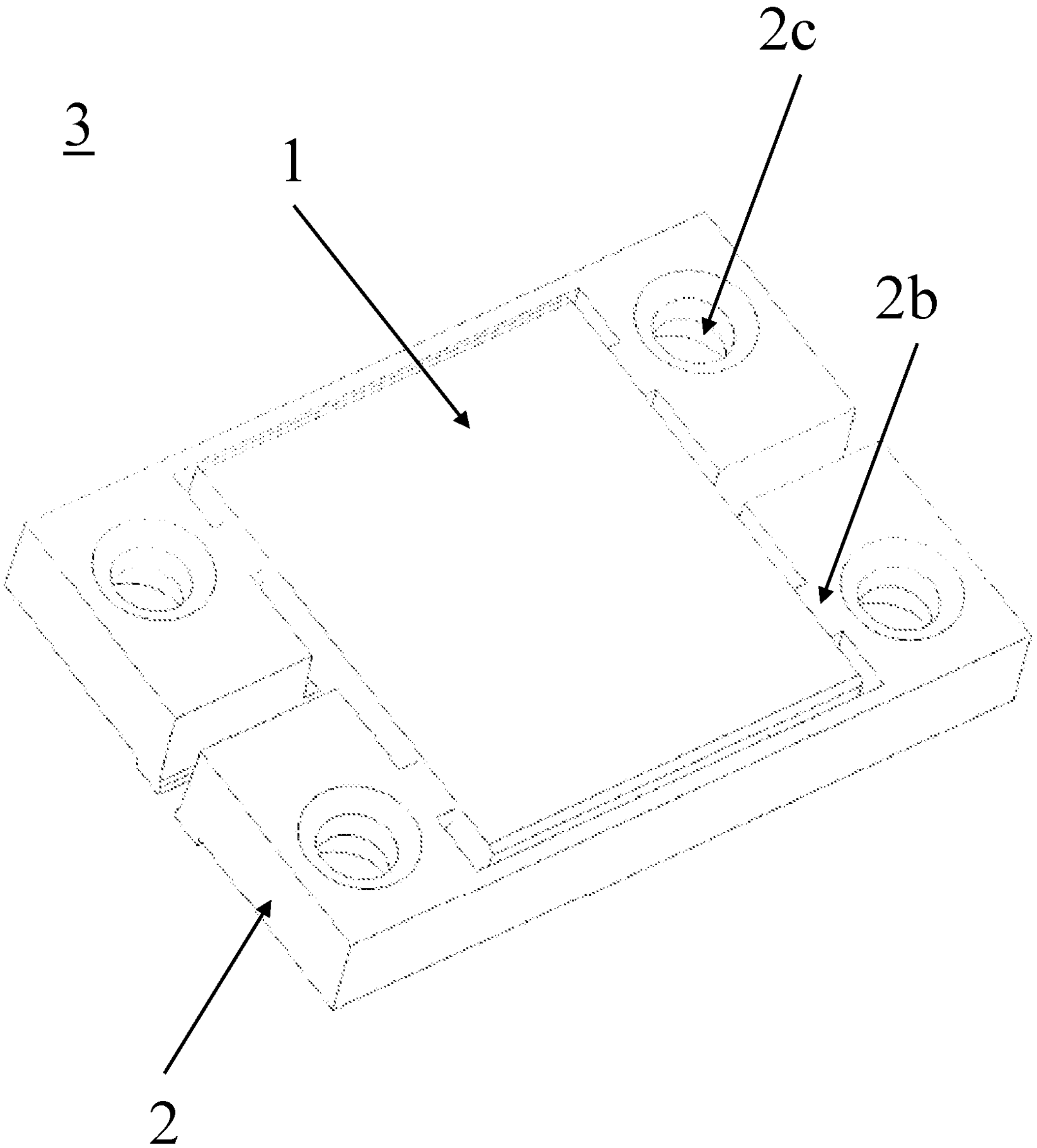
FIG. 5 is an illustration of the spring strap of the present invention assembled into the spring strap clip in their normal state as depicted in a CAD model, they form the spring clip subassembly.
Figure 6:
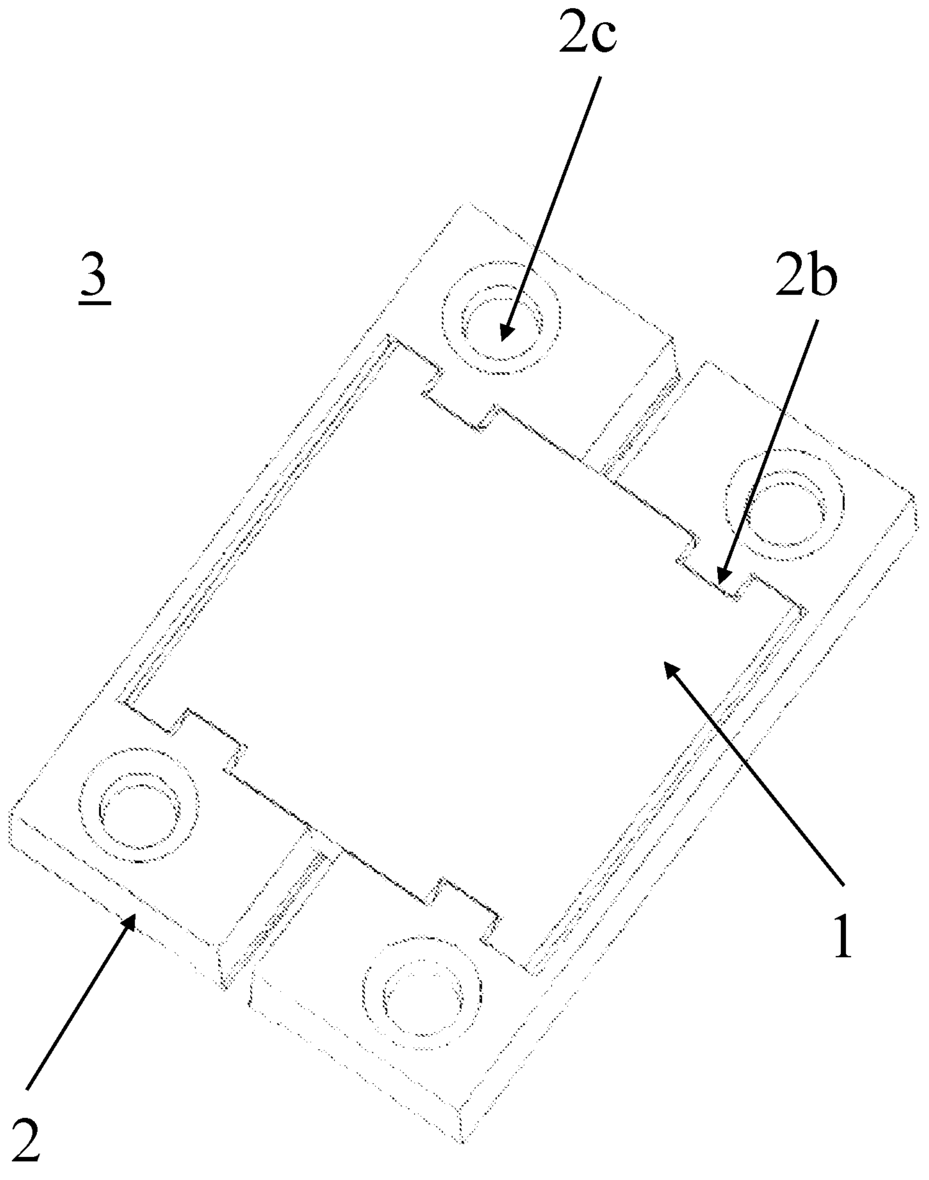
FIG. 6 illustrates whereby when the spring strap of the present invention is assembled into the spring strap clip in their normal state, they form the spring clip sub-assembly.

FIG. 5 is an illustration of the spring strap 1 of the present invention assembled into the spring strap clip in their normal state as depicted in a CAD model, they form the spring clip subassembly. FIG. 6 illustrates whereby when the spring strap 1 of the present invention is assembled into the spring strap clip in their normal state, they form the spring clip sub-assembly 3. This sub-assembly 3 can be manipulated as such without the fear that the sprint strap falls from its position even when the subassembly is manipulated upside down. This allows more flexibility in the following assembly step procedure design.

Figure 7:
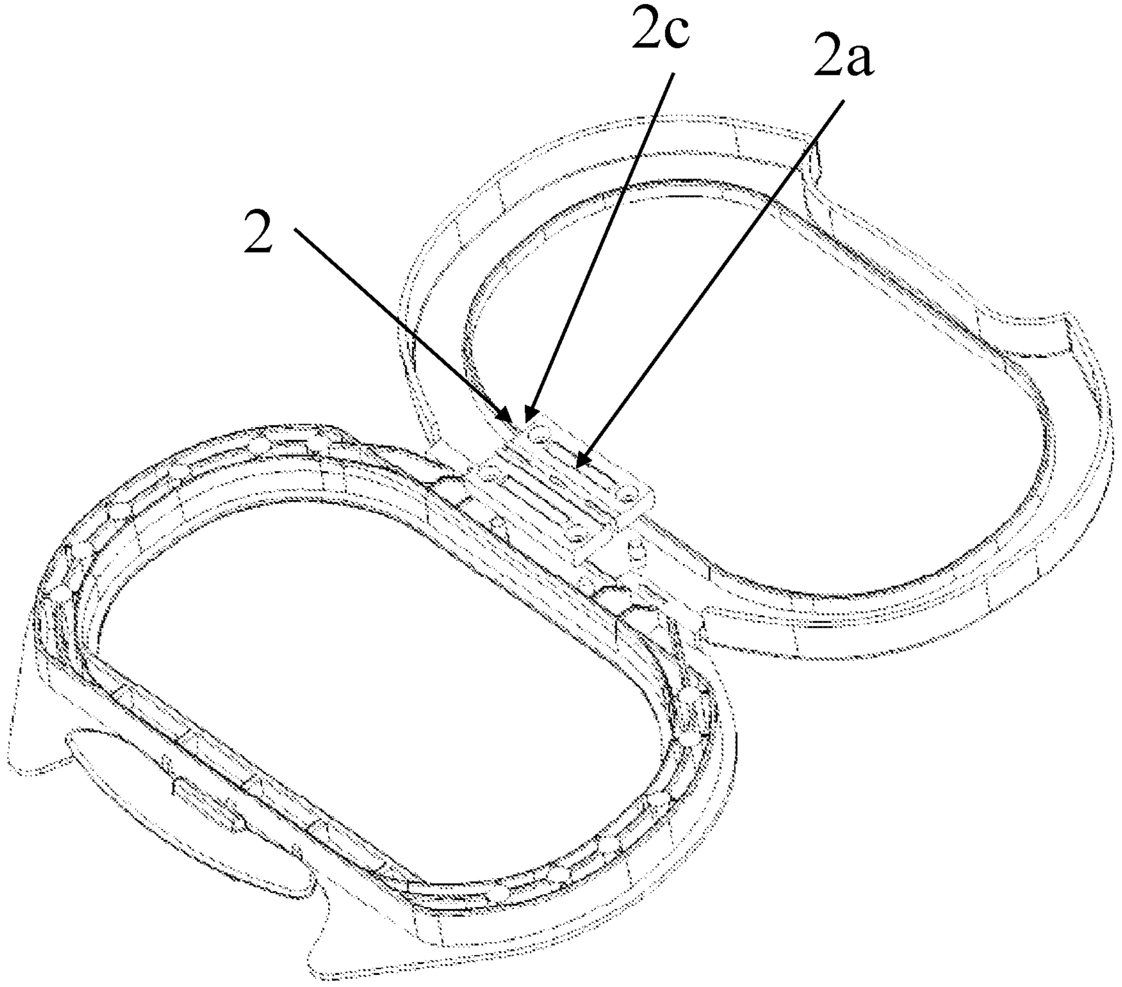
FIG. 7 is an illustration of the spring clip sub-assembly before assembly into a lid closure in their open state as depicted in a CAD model.
Figure 8:
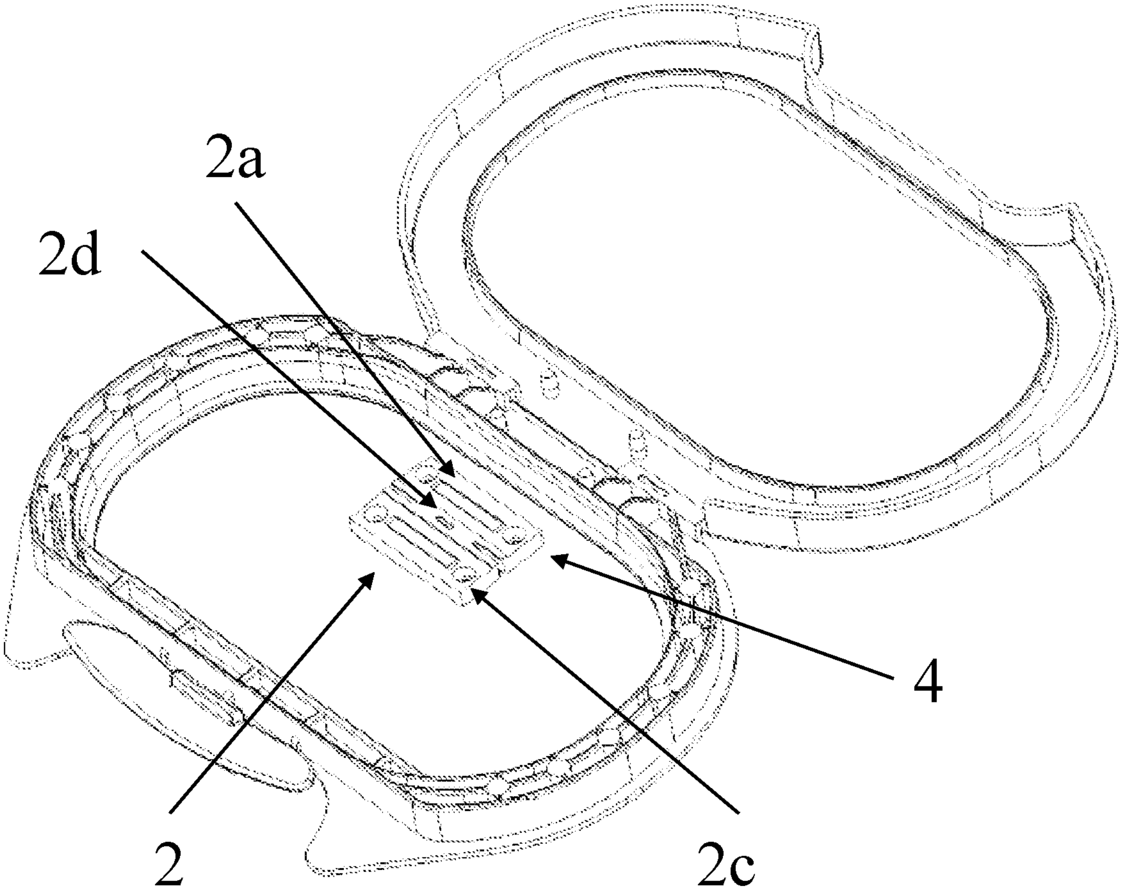
FIG. 8 is an illustration of the spring clip sub-assembly placed within the lid closure in their open state, this is before assembly.
Figure 9:
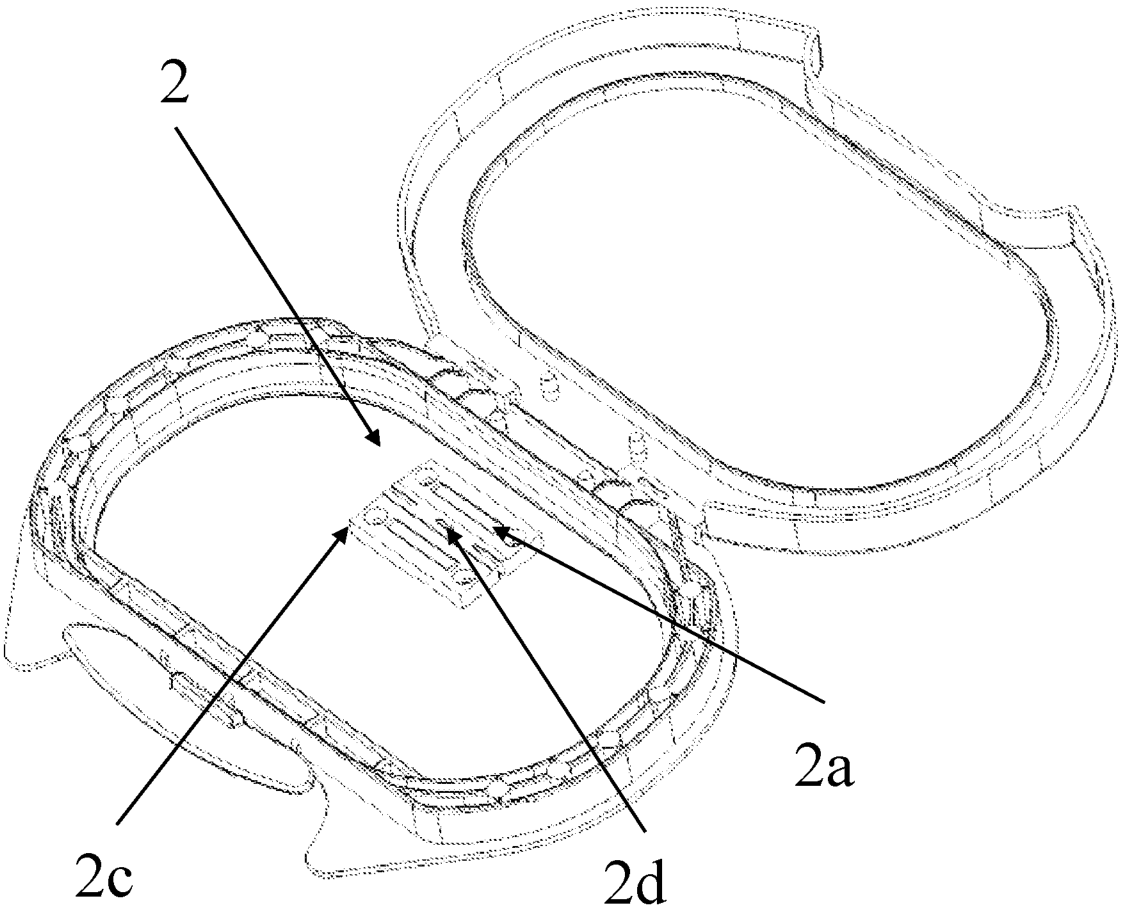
FIG. 9 is an illustration of the spring clip sub-assembly assembled into a lid closure in their open state.

FIG. 7 is an illustration of the spring clip sub-assembly 3 before assembly into a lid closure in their open state as depicted in a CAD model. The sub-assembly 3 will then be assembled onto the closure, and it will be assembled with the help of two sets of fastening features, a post-hole relationship as well as snap fit fasteners. The spring strap 1 will be in between the closure and the spring strap clip 3. When assembled, the spring strap clip's living hinge 2*d* is aligned with the closure's living hinge 2*d* so that they allow the same range of motion. Both closure and sub-assembly 3 have to be in their opening position to be assembled together. FIG. 8 is an illustration of the spring clip sub-assembly 3 placed within the lid closure in their open state, this is before assembly;

FIG. 9 is an illustration of the spring clip sub-assembly 3 assembled into a lid closure in their open state. Once the closure system 4 and the sub-assembly 3 are assembled together, the spring strap 1 is in its relaxed position.

Figure 10:
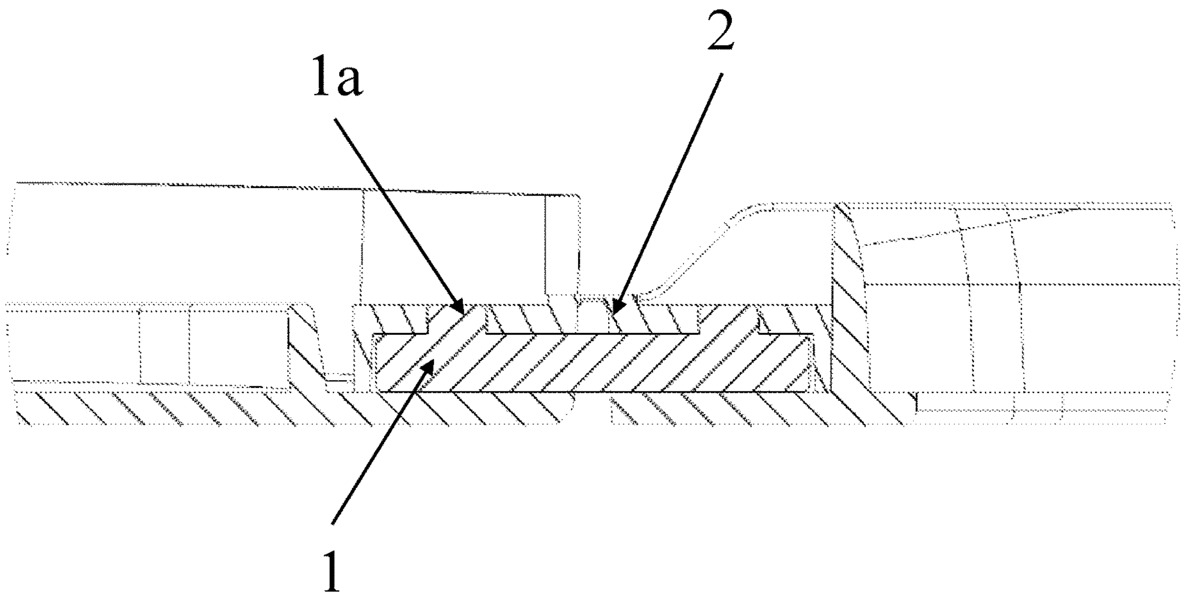
FIG. 10 is an illustration of the product incorporating the spring strap clip assembled in between the spring strap clip and the closure system in their open state as depicted in a CAD model.

FIG. 10 is an illustration of the product incorporating the spring strap clip assembled in between the spring strap clip and the closure system 4 in their open state as depicted in a CAD model. The closure system 4 is divided into 4 main section, the lid, the base, the hinge along with the sub-assembly 3 and the button at the front of the system. The button acts as a latch to hold the lid when the lid is closed over the base. The lid is articulated around the base through the hinge made from a living hinge 2*d*. Half of the sub-assembly 3 is attached to the base portion of the closure system 4 and the other half is attached to the lid portion of the closure system 4.

Figure 11:
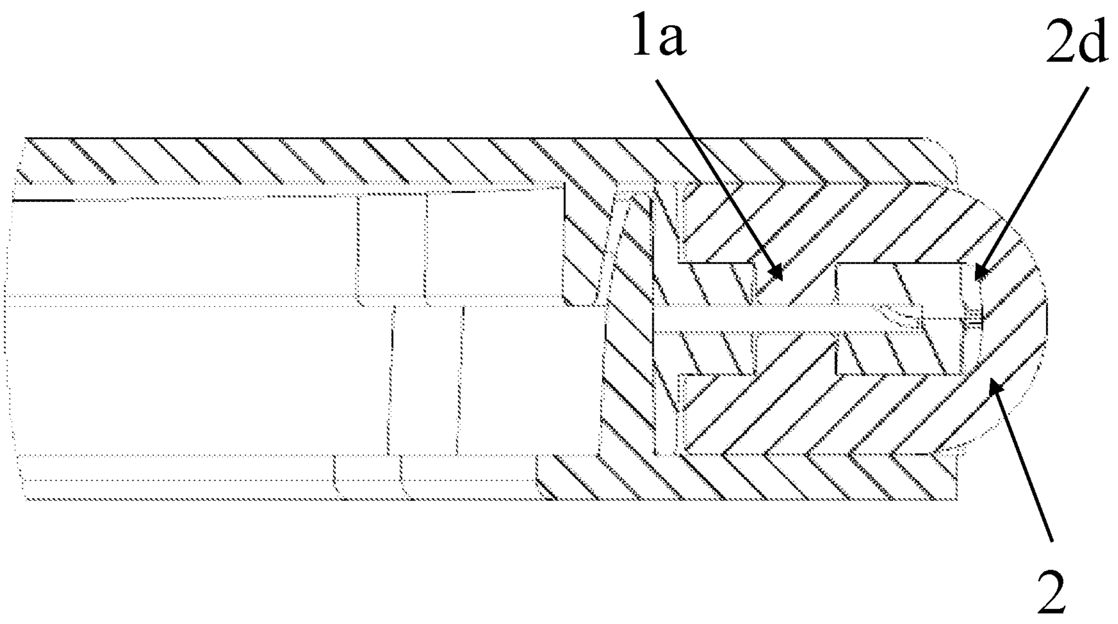
FIG. 11 is an illustration of the product incorporating the spring strap clip assembled in between the spring strap clip and the closure system in their close state as depicted in a CAD model, the spring strap is extended between its ridges and extends behind the living hinge.

FIG. 11 is an illustration of the product incorporating the spring strap clip assembled in between the spring strap clip and the closure system 4 in their close state as depicted in a CAD model, the spring strap 1 is extended between its ridges 1*a* and extends behind the living hinge 2*d*. When the end-user starts to close the lid, the lid's half sub-assembly 3 will follow the lid's motion and the spring strap 1 will start to be extended storing elastic energy. The spring strap 1 will extend in between the ridges 1*a* as those are locked into the slots 2*a* of the spring strap clip.

Figure 12:
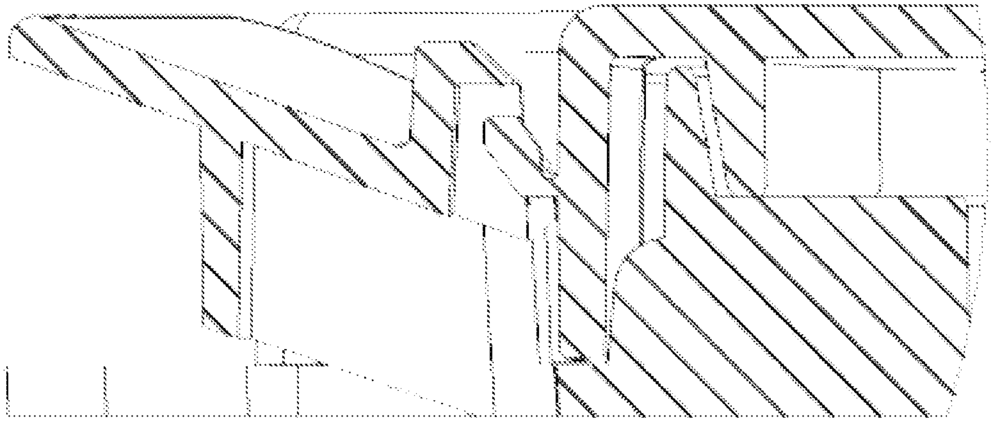
FIG. 12 is an illustration of the base and lid's latch, with the slanted button as depicted in a CAD model. The bottom edge of thin walls underneath the button are parallel to its top surface.

FIG. 12 is an illustration of the base and lid's latch, with the slanted button as depicted in a CAD model. The bottom edge of thin walls underneath the button are parallel to its top surface. At the end of the lid closing motion, its front edge has a latch that will hook itself underneath the button of the base.

Figure 13:
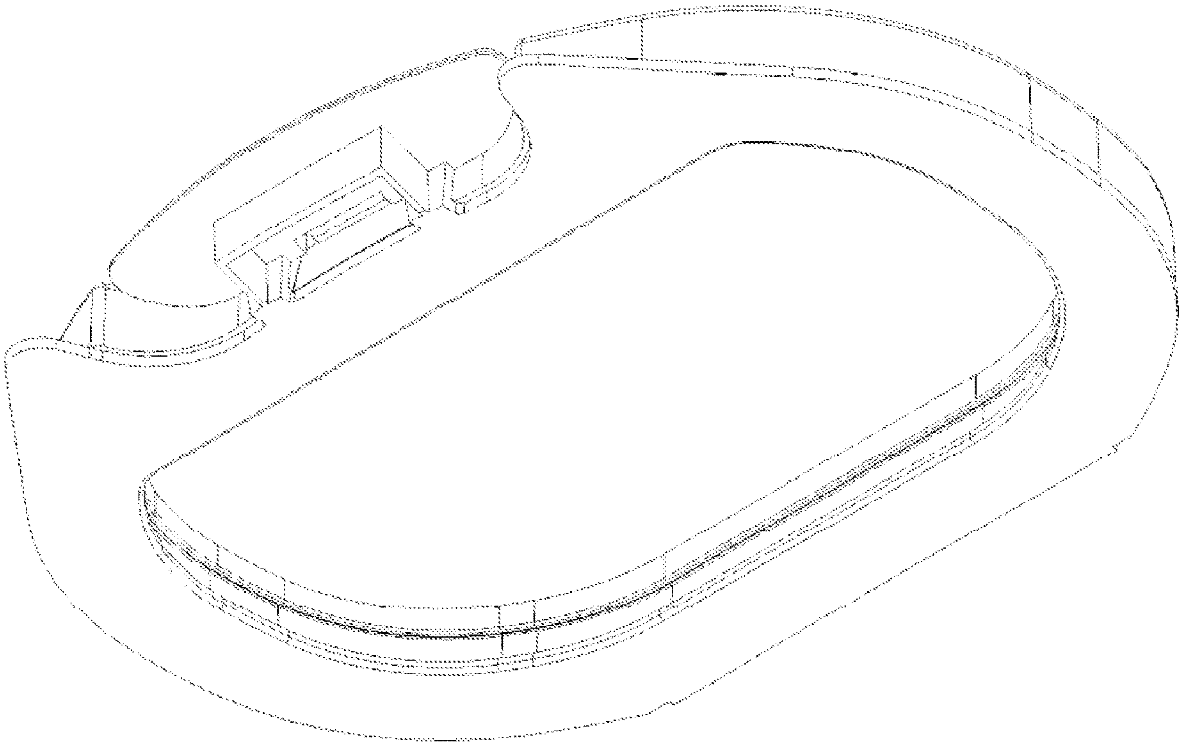
FIG. 13 is an illustration of the wide body button with the thin walls underneath as depicted in a CAD model.

FIG. 13 is an illustration of the wide body button with the thin walls underneath as depicted in a CAD model. The button is at the front of the base, it allows the end-user to push on it. The button is design with two walls attaching it to the base, those walls will allow the button to bend forward and release the lid's latch. It is designed to resist the user interaction and provides a specific activation force to release the lid's latch.

The button is designed to be more than 30 mm in width and is slanted towards the lid in order to give a better button activating experience to the user (it is as wide or wider than two average fingers width). As the user pushes down, the button will naturally distance itself from the lid, increasing the effectiveness of the release of the lid's latch. It is also equipped with a thin-walled structured underneath, their bottom surface is parallel to the button's top surface and designed so that the button avoids being damaged by accidental over travel The thin wall will limit the over travel by having its bottom edge touch the pouch containing the wet tissues.

The latch's position in reference to the area where the button is attached to the base is designed so that the lever arm at the button activation surface is smaller than at the latch, increasing the ease for the user to activate the button.

On both sides of the button, on the base, we have two flat area protruding forward from the base, these are to prevent the base to flip forward while the button is being pushed downward. This helps the button bend forward.

Upon activation of the button, the lid's latch will release, and the lid will be pulled upward by the stored elastic energy from the spring strap 1, the lid will pop open presenting the reach-in area of the closure to the end-user allowing him to access the content of the container.

Structural ribs have also been added to the base so that it strengthens the base and avoid vertical ribs or wall to move forward while pushing the button down, otherwise, the walls will collide between the lid and the base, preventing the lid to be pulled up by the spring elastic force when it is released.

One key element of this invention is the position of the spring strap 1 in reference to the living hinge 2*d* and the angle orientation. If we consider the angle between the base, the lid and the living hinge being the summit of the angle, the spring strap 1 has to be attached to the exterior of the angle, otherwise, it will not get stretched but compressed.

Figure 14:
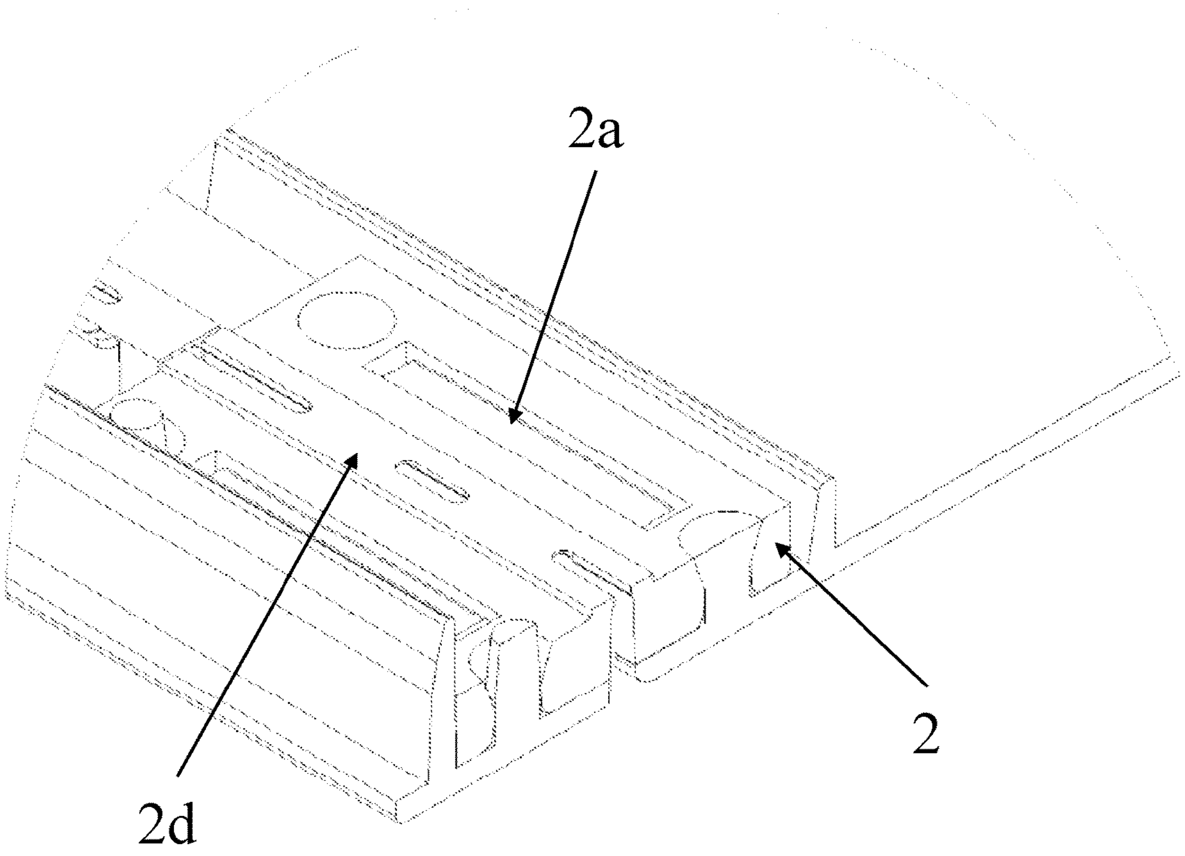
FIG. 14 shows both the state of the spring clip before and after the hot melt process on opposing assembly features.

FIG. 14 shows both the state of the spring clip before and after the hot melt process on opposing assembly features. In one embodiment, the spring clip is clipped into place using the spring clip with snapping features. In an alternative embodiment, there is an area that uses hot melt to fill a cavity on the spring clip so that it does not allow the end user to disassemble it. The additional advantage of using hot melt to fill a cavity to retain the spring clip is that this also ensures proper position for the spring clip during usage. FIG. 14 shows both state before and after the hot melt process on opposing assembly features.

Thus, it is appreciated that the optimum dimensional relationships for the parts of the invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention is determined by the appended claims and their legal equivalents, rather than by the examples given.

The embodiments of the invention in which an exclusive property or privilege is claimed are defined as follows:

1. A closure system comprising an extruded spring strap in combination with a base, a lid, and a spring strap clip for creating container and packaging applications comprising:

the extruded spring strap folded around an axis parallel to the extruded spring strap's own axis of extrusion;

the spring strap clip and spring strap having corresponding matching slots, bosses, and holes for assembly and position locking together;

the spring strap clip has fastening slots, bosses, and holes to be assembled to the rest of the closure system;

the spring strap connects to the spring strap clip, which then itself connects to the container base and lid;

the spring strap clip comprising a living hinge that separates the spring strap and the spring strap clip, which each connect to the lid and base;

the extruded spring strap stores and releases energy in order to displace the lid; and a retention latch is a part of the lid or an additional part assembled to the lid by fasteners.

2. The closure system for a container of claim 1, wherein the retention latch is a user interface which acts to have the lid pop-up.

3. The closure system for a container of claim 1, wherein the lid provides air sealing that allows the lid to effectively separate first and second environments above and below the lid.

4. The closure system for a container of claim 1, wherein the base is connected to the lid by a physical bonding creating the living hinge.

5. The closure system for a container of claim 1, wherein the base is connected to the lid by a snap fit creating rotation.

6. The closure system for a container of claim 1, wherein the spring strap clip comprises the living hinge that separates the spring strap clip into two distinctive halves.

7. The closure system for a container of claim 1, wherein the retention latch is a user interface used to make the lid pop-up.

8. The closure system for a container of claim 1, wherein the retention latch is more than 30 mm in width.

9. The closure system for a container of claim 1, wherein a top surface of the retention latch is slanted at an angle comprise between 20 and 40 degrees.

10. The closure system for a container of claim 1, wherein the retention latch further comprising walls protruding to prevent damage by accidental over traveling.

11. The closure system for a container of claim 1, wherein the retention latch deforms, and a lip of the retention latch is displaced from its locked position and releases the engaged lip of the lid.

12. The closure system for a container of claim 1, wherein the spring strap clip is connected to the lid and base by a snap-in features, glue, or fasteners.

13. The closure system for a container of claim 1, wherein pressing on a retention latch releases a force stored in the extruded spring strap pushing back the lid allowing to access the content of a container through a reach-in area.

14. The closure system for a container of claim 1, wherein the base, lid, and retention latch are made from a plastic; and the extruded spring strap is made from extruded silicone.

* * * * *